Patented June 21, 1938

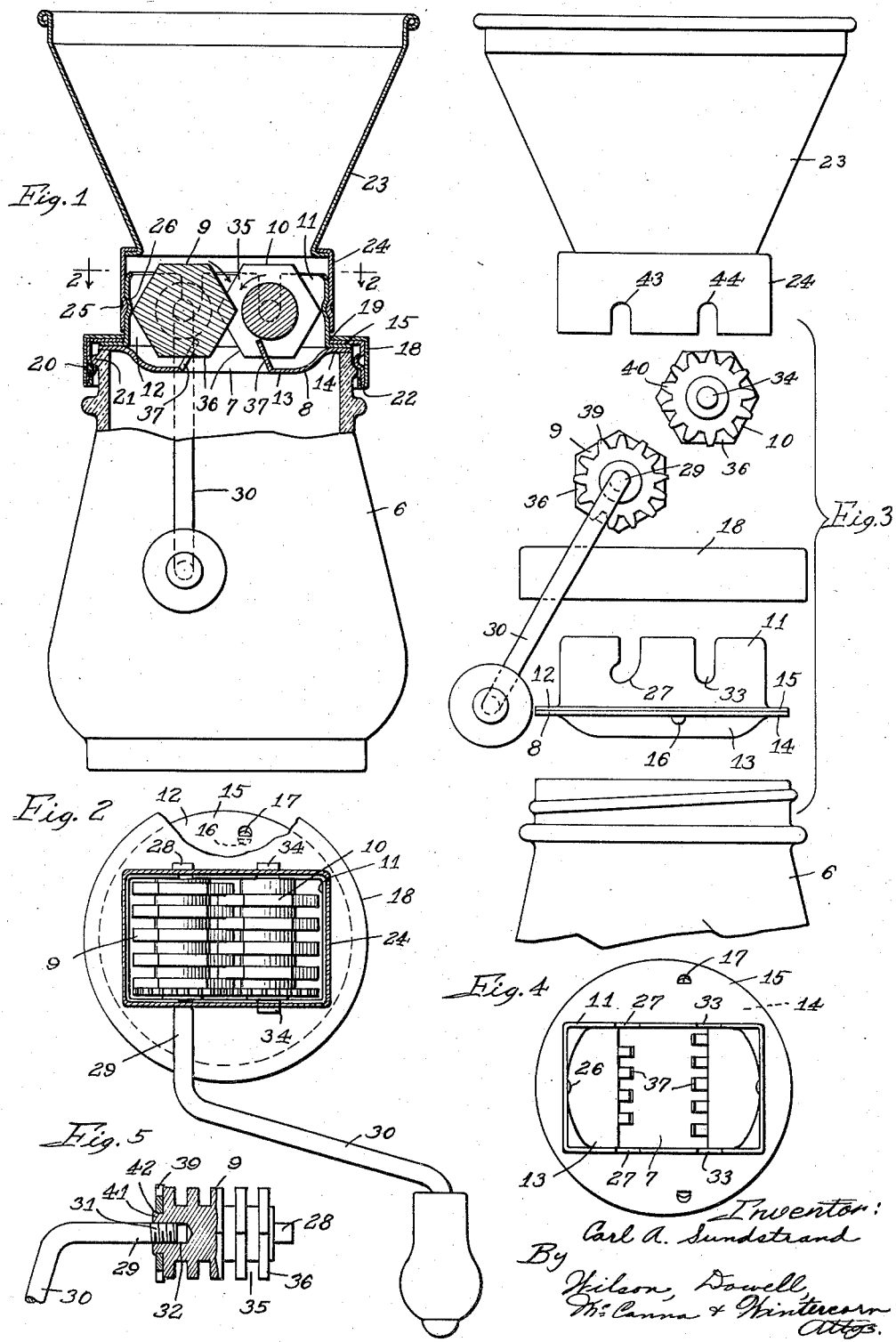

2,121,453

UNITED STATES PATENT OFFICE 2,121,453

KITCHEN UTENSIL

Carl A. Sundstrand, Rockford, Ill.

Application January 22, 1937, Serial No. 121,804

8 Claims. (Cl. 146—122)

This invention relates to kitchen utensils and more specifically a device especially designed and adapted for quick, clean, easy cutting of raisins, pitted dates, olives, peppers, orange peel, lemon peel, cherries, citron, etc.

The principal object of my invention is to provide a cutting device of simple, compact and economical construction and one which may be taken apart and put together easily by mechanically unskilled persons so that it may be thoroughly cleaned. Most devices offered in the past have been objectionable because they were not designed to be taken apart easily and hence could not be kept entirely clean and, as a result, were unsanitary.

Another object is to provide a device of this kind made to form a unitary assembly with a glass jar which serves as the receptacle for the cut-up food, the jar also affording a good base for the device and one which the operator can readily hold in one hand while turning the crank with the other, so that there is no need for clamping the device to the table and no danger of spilling the food.

The invention also aims to utilize stamped sheet metal parts in the major portion thereof and cutter parts capable of being produced on a screw machine, whereby to obtain low production cost and still obtain the requisite strength and durability.

The invention is hereinafter described by reference to the accompanying drawing, in which—

Figure 1 is a central vertical section through the utensil of my invention;

Fig. 2 is a horizontal section on the line 2—2 of Figure 1 with a portion of the cap broken away to reveal a portion of the bearing plate;

Fig. 3 is a side view of the parts shown in disassembled relation to one another but in the order of their assembly;

Fig. 4 is a top view of the bearing plate, and

Fig. 5 is a view of the front cutter partly in longitudinal section to better illustrate its construction and showing only the end of the crank.

The same reference numerals are applied to corresponding parts throughout the views.

The utensil base is a glass jar 6 adapted to receive the cut-up food which drops through the opening 7 in the stripper plate 8 from between the cutters 9 and 10. The cutters are housed in the upstanding rectangular portion 11 of a bearing plate 12 and they also project to a certain extent down into the generally rectangular, central dished portion 13 of the stripper plate 8. The arcuate marginal portions 14 and 15 of the plates 8 and 12, respectively, are arranged to be secured together in any suitable manner with the rectangular portions 11 and 13 of the plates in register, as, for example, by the entrance of downwardly projecting lugs 16 on the bearing plate 12 through registering holes 17 in the stripper plate 8, which lugs are bent under the stripper plate just enough to hold the parts together but permit them to be taken apart easily by bending these lugs back slightly. Marginal portions 14—15 are arranged to rest on the lip of the jar and be clamped in place when the cap 18 is applied to the jar. The cap is herein shown as made of two interfitting sheet metal parts, both parts having rectangular center holes 19 for the projection therethrough of the rectangular portion 11 of the bearing plate. The inner part is formed to provide threads 20 for cooperation with the thread 21 molded on the neck of the jar, and the outer part simply covers up the inner part and is made plain for best appearance, the outer part telescoping on the inner part and having its lower edge bent inwardly, as at 22, clinching around the lower edge of the inner part to complete the assembly. A hopper 23 is suitably secured in the open top of a sheet metal cover 24 arranged to fit snugly over the outside of the housing portion 11 of the bearing plate. Rounded projections 25 in the opposite end walls of the cover 24 are formed by struck-in portions of said walls and are arranged to fit in similar shaped recesses 26 provided therefor in a similar manner in the ends of the housing portion 11 of the bearing plate, whereby to detachably secure the hopper in assembled position on the device.

The opposed side walls of the housing portion 11 of the bearing plate have registering vertical bayonet slots 27 provided therein to receive in the offset lower ends thereof the reduced projecting axle portion 28 of the front cutter 9 in one slot and the coaxially arranged end 29 of the crank 30 on said cutter in the other slot. These bayonet slots give better bearing support for the cutter 9 than would be afforded by straight slots and, of course, this is desirable because this cutter has the operating crank on one end and might otherwise tend to "teeter" in the turning of the crank and result in a binding action being set up between the cutters. The crank 30 has its axle forming end 29 threaded as at 31 for threaded connection with the cutter 9 in the axial hole 32 provided in the end thereof opposite the axle 28 (see Fig. 5). Spaced from the bayonet slots 27 are two straight vertical slots 33 and these are also in register and in parallel relation to the slots 27 and adapted to receive the reduced axle ends 34 of the rear cutter 10. The cutters 9 and 10 are both produced from hexagonal bar stock and each made in one piece by annularly grooving the cutter body, as at 35, to define spaced hexagonal blade portions 36. The grooves 35 in one cutter are made just large enough to accommodate the blade portions 36 of the other cutter therein, the blade portions 36 on the two cutters being in staggered relation, as shown in Fig. 2. These grooves 35 in the two cutters also have lugs 37 projecting therein from the stripper plate 8, as indicated in Figure 1, whereby to scrape off any fragments that might otherwise remain adhering to the cutters in the grooves thereof. The normal direction of rotation of the cutter 9 is clockwise and of the cutter 10 counterclockwise by reason of the meshing engagement of gears 39 and 40 provided on the cutters 9 and 10, respectively, and it is obvious from an inspection of Fig. 1, wherein the small arrows indicate the direction of rotation of the cutters, that whatever is scraped off the cutters by the lugs 37 of the stripper plate can accumulate only on the bottom surfaces thereof and will accordingly eventually drop into the jar. The gears 39 and 40 are both punched from sheet metal for economy in production and, as shown in Fig. 5, have a press fit on the reduced cylindrical end portions 41 of the cutters, which project through the center holes in the gears sufficiently to permit secure fastening of the gears in place by merely upsetting the projecting ends of the reduced portions, as indicated at 42.

It is obvious that if the cutter 9 is first assembled in the slots 27 and then the cutter 10 is dropped into place in the slots 33, the cutters are securely retained in assembled relation when the cover 24 carried on the bottom of the hopper is assembled over the housing portion 11 of the bearing plate, because there are two straight, vertical slots 43 and 44 in both sides of the cover to receive the axle 28 and crank end 29 of the one cutter in the slots 43 and the axle ends 34 of the other cutter in the slots 44. The slots 43 are spaced from the slots 44 the same distance as the lower offset ends of the slots 27 are spaced from the slots 33. Hence the cutters are kept in a predetermined desired spaced relationship for easiest and most efficient operation.

Fig. 3 indicates the order of assembly: The cap 18 fits down onto the bearing plate 12 over the housing portion 11 thereof; the cutter 9 is received in the slots 27; then the cutter 10 is entered in the slots 33, and finally the hopper 23 is assembled on the housing portion 11 of the bearing plate 12. The assembly just described fits neatly on the lip of the jar 6 and is clamped firmly in place thereon when the cap 18 is threaded tightly in place. It is obvious from an inspection of Fig. 3 that the device may be cleaned easily because when it is taken apart the individual parts are fully accessible and no crevices or corners are left in which food will stay lodged. If the bearing plate and stripper plate assembly cannot be cleaned sufficiently in its semi-assembled form it is a simple matter to bend the lugs 16 back slightly and take the plates apart when, of course, both may be cleaned easily.

In operation, the blade portions 36 disposed in staggered intermeshing relation and arranged to turn in opposite directions in the operation of the crank 30 afford a multiplicity of scissors-like shearing actions so that the food-stuff placed in the hopper and fed therefrom by gravity to the cutters will be cut quickly and easily. The cut up food drops through the opening 7 into the jar 6 and, as previously indicated, there is no danger of the cutters becoming clogged inasmuch as the lugs 37 on the stripper plate 8 are continuously scraping the cutters clean and keeping food particles from lodging in the grooves thereof. The fact that the cutters are hexagonal is of two-fold advantage: It produces a desirable agitation of the foodstuff in the hopper next to the cutters to insure keeping the food moving toward the cutters, and it provides a multiplicity of separate and distinct straight cutting edges on each blade of the cutters to give a correspondingly multiplied number of separate and distinct cutting actions, which I have found contributes toward easier cutting, probably because of the fact that the cutting action is not continuous as with circular cutters. These cutters cut intermittently and are repeatedly taking a new "hold" at the completion of each cutting action. One series of straight edges on the one cutter pass by a related series of straight edges on the other cutter with a shearing action, and then two new series of cutting edges on the cutters come into action, and so on. It is of course, obvious that while I have shown hexagonal cutters other polygonal forms might be used to equal or even better advantage. The fact that the threads at 31 are right hand insures against the operator turning the cutters in the wrong direction and thus defeating the various objects for which this device was specially designed. When the crank 30 is turned in a clockwise direction any resistance to the turning of the cutter 9 will obviously tend to tighten the connection between the crank and cutter.

It is believed the foregoing description conveys a good understanding of all of the objects and advantages of my invention. The appended claims have been drawn with a view to covering all legitimate modifications and advantages.

I claim:

1. A device of the character described comprising a frame member having a substantially rectangular housing portion open at top and bottom, two opposed walls of which have correspondingly spaced slots provided therein extending downwardly from the top thereof, a pair of cutters rotatably mounted in side by side relation in said housing portion, the cutters being annularly grooved in staggered relation to define blade portions which interengage for a shearing action, axles on said cutters rotatably and removably received in said slots, intermeshing gears on said cutters for causing rotation of one cutter in the opposite direction when the other cutter is turned, means for turning the latter, a hopper adapted to be mounted on said frame over said housing portion to receive the material to be operated on by said cutters, and a cover for said housing portion on the bottom of said hopper and arranged to close said slots so as to retain the axles of said cutters in operative position in said slots.

2. A device of the character described comprising a frame member having a substantially rectangular housing portion open at top and bottom, two opposed walls of which have correspondingly spaced slots provided therein extending downwardly from the top thereof, a pair of cutters rotatably mounted in side by side relation in said housing portion, the cutters being annularly grooved in staggered relation to define blade portions which interengage for a shearing action, one related pair of slots having the lower ends thereof extended away from the other slots to provide offset bearings, axles on opposite ends of one cutter rotatably received in said offset bearings, means connected with one of said axles for turning the cutter, the other slots being straight and the lower ends of said slots providing bearings, axles on the opposite ends of the other cutter rotatably received in said last named bearings, intermeshing gears on said cutters for turning the idler cutter in the opposite direction from the driven cutter, a hopper to receive material to be cut by said cutters, and a connector cover for the housing portion on the bottom of said hopper having two opposed walls wherein parallel slots are provided to receive the axles aforesaid, the one related pair of last mentioned slots being disposed crosswise relative to the offset ends of the first named slots.

3. A device of the character described comprising a frame member having a substantially rectangular housing portion open at top and bottom, two opposed walls of which have correspondingly spaced slots provided therein extending downwardly from the top thereof, a pair of cutters rotatably mounted in side by side relation in said housing portion, axles on said cutters rotatably and removably received in said slots, intermeshing gears on said cutters for causing rotation of one cutter in the opposite direction when the other cutter is turned, means for turning the latter, a hopper adapted to be mounted on said frame over said housing portion to receive the material to be operated on by said cutters, and a cover for said housing portion on the bottom of said hopper and arranged to close said slots so as to retain the axles of said cutters in operative position in said slots.

4. A device of the character described comprising a frame member having a substantially rectangular housing portion open at top and bottom, two opposed walls of which have correspondingly spaced slots provided therein extending downwardly from the top thereof, a pair of cutters rotatably mounted in side by side relation in said housing portion, one related pair of slots having the lower ends thereof extended away from the other slots to provide offset bearings, axles on opposite ends of one cutter rotatably received in said offset bearings, means connected with one of said axles for turning the cutter, the other slots being straight and the lower ends of said slots providing bearings, axles on the opposite ends of the other cutter rotatably received in said last named bearings, intermeshing gears on said cutters for turning the idler cutter in the opposite direction from the driven cutter, a hopper to receive material to be cut by said cutters, and a cover for the housing portion on the bottom of said hopper having two opposed walls wherein parallel slots are provided to receive the axles aforesaid, the one related pair of last named slots being disposed crosswise relative to the offset ends of the first named slots.

5. A device of the character described comprising a frame member having a substantially rectangular housing portion open at top and bottom, two opposed walls of which have correspondingly spaced slots provided therein extending downwardly from the top thereof, a pair of cutters rotatably mounted in side by side relation in said housing portion, axles on said cutters rotatably and removably received in said slots, a hopper adapted to be mounted on said frame over said housing portion to receive the material to be operated on by said cutters, and a cover for said housing portion on the bottom of said hopper and arranged to close said slots so as to retain the axles of said cutters in operative position in said slots, the housing portion and cover therefor being of sheet metal, and said cover being arranged to telescope on said housing portion, abutting walls of the cover and housing having indentations in registering relation in a predetermined plane with respect to the bottom of the slots wherein the axles of said cutters are mounted, the walls of said cover and housing being springable sufficiently for detachable interengagement of said indentations whereby to frictionally and releasably retain the hopper on the frame by means of said cover with the cover disposed in a predetermined operative relation to the axles of said cutters.

6. A device of the character described comprising a frame member having a substantially rectangular housing portion open at top and bottom, two opposed walls of which have correspondingly spaced slots provided therein extending downwardly from the top thereof, a pair of cutters rotatably mounted in side by side relation in said housing portion, one related pair of slots having the lower ends thereof extended away from the other slots to provide offset bearings, axles on opposite ends of one cutter rotatably received in said offset bearings, means connected with one of said axles for turning the cutter, the other slots being straight and the lower ends of said slots providing bearings, axles on the opposite ends of the other cutter rotatably received in said last named bearings, a hopper to receive material to be cut by said cutters, and a cover for the housing portion on the bottom of said hopper having two opposed walls wherein parallel slots are provided to receive the axles aforesaid, the one related pair of last named slots being disposed crosswise relative to the offset ends of the first named slots, the housing portion and cover therefor being of sheet metal, and said cover being arranged to telescope on said housing portion, abutting walls of the cover and housing having indentations in registering relation in a predetermined plane with respect to the bottom of the slots wherein the axles of said cutters are mounted, the walls of said cover and housing being springable sufficiently for detachable interengagement of said indentations whereby to frictionally and releasably retain the hopper on the frame by means of said cover with the cover disposed in a predetermined operative relation to the axles of said cutters.

7. A device of the character described comprising a receptacle for cut material having a circular open top portion, a pair of circular sheet metal disks disposed in superimposed relation resting marginally on the top portion of said receptacle, the lower disk having a central rectangular portion struck downwardly therefrom formed with a rectangular opening transversely of the middle thereof for passage of cut material therethrough into said receptacle and the upper disk having struck up therefrom a rectangular housing wall substantially in register with the rectangular portion of the lower disk, said lower disk having scraping lugs struck up from opposite sides of the opening, a closure cap for the receptacle having a rectangular opening provided therein receiving said projecting housing, said cap engaging the top of the upper disk marginally whereby to clamp said disks on the receptacle in the application of the cap to the latter, cutting means mounted in said rectangular housing in operative relation to the aforesaid scraping lugs and operable by a hand crank projecting from the housing alongside said receptacle, and a hopper having a rectangular cover on the bottom thereof arranged to fit telescopically over said housing, the cover having a slot provided in at least one side thereof for extension therethrough of said hand crank.

8. A device of the character described comprising a receptacle for cut material having a circular open top portion, a pair of circular sheet metal disks disposed in superimposed relation resting marginally on the top portion of said receptacle, the lower disk having a central rectangular portion struck downwardly therefrom formed with a rectangular opening transversely of the middle thereof for passage of cut material therethrough into said receptacle and the upper disk having struck up therefrom a rectangular housing wall substantially in register with the rectangular portion of the lower disk, said lower disk having scraping lugs struck up from opposite sides of the opening, a closure cap for the receptacle having a rectangular opening provided therein receiving said projecting housing, said cap engaging the top of the upper disk marginally whereby to clamp said disks on the receptacle in the application of the cap to the latter, cutting means mounted in said rectangular housing in operative relation to the aforesaid scraping lugs and operable by a hand crank projecting from the housng alongside said receptacle, and a hopper having a rectangular cover on the bottom thereof arranged to fit telescopically over said housing, the cover having a slot provided in at least one side thereof for extension therethrough of said hand crank, abutting walls of the cover and housing having indentations in registering relation in a predetermined plane with respect to the hand crank, the walls of said cover and housing being springable sufficiently for detachable interengagement of said indentations whereby to frictionally and releasably retain the hopper on the housing by means of said cover with the cover disposed in a predetermined operative relation to the hand crank.

CARL A. SUNDSTRAND.

CERTIFICATE OF CORRECTION.

Patent No. 2,121,453. June 21, 1938.

CARL A. SUNDSTRAND.

It is hereby certified that error appears in the printed specification of the above numbered patent requiring correction as follows: Page 3, first column, line 17, claim 2, strike out the word "connector"; page 4, second column, line 10, claim 8, for "housng" read housing; and that the said Letters Patent should be read with this correction therein that the same may conform to the record of the case in the Patent Office.

Signed and sealed this 9th day of August, A. D. 1938.

Leslie Frazer (Seal) Acting Commissioner of Patents.